UNITED STATES PATENT OFFICE.

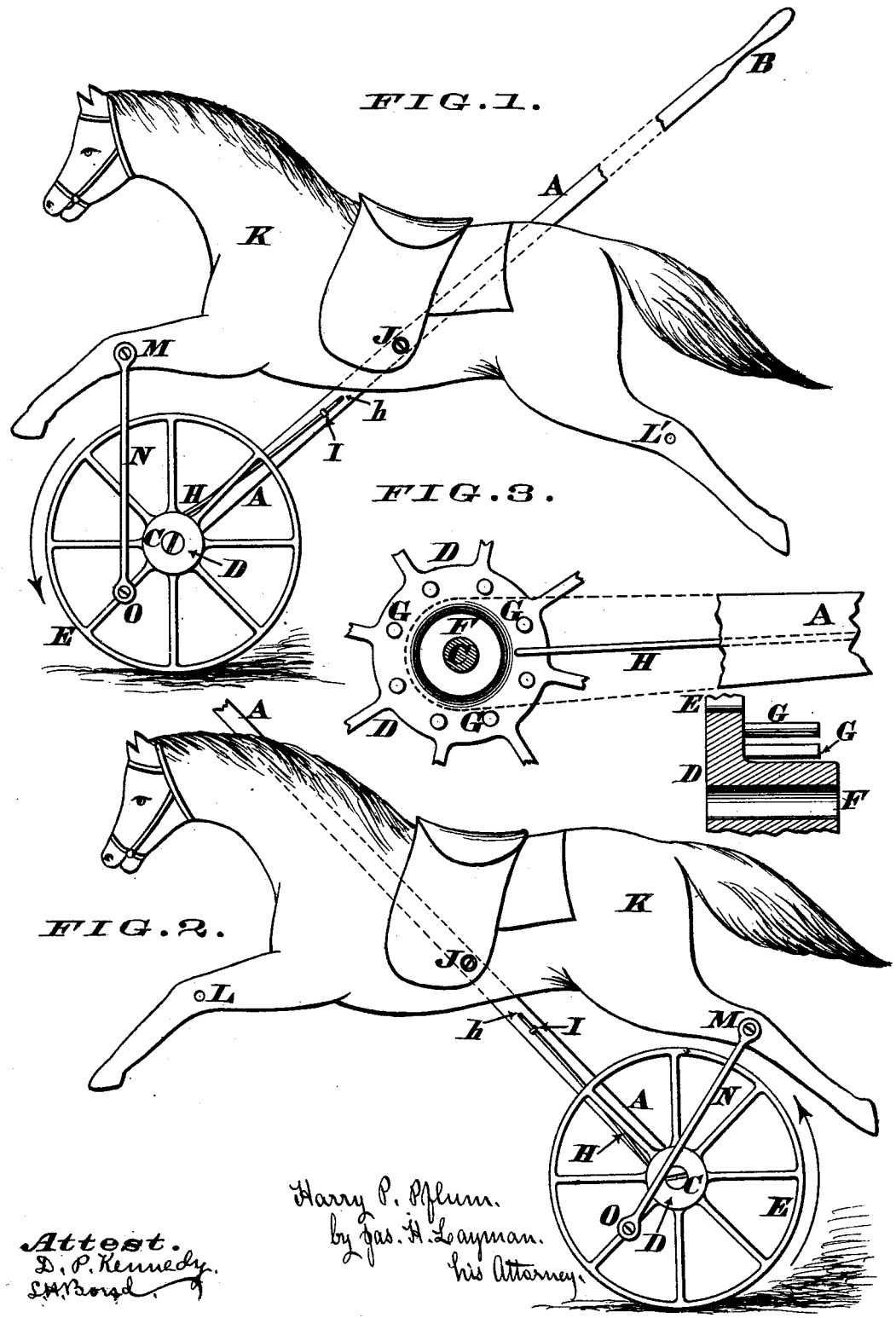

HARRY P. PFLUM, OF CINCINNATI, OHIO, ASSIGNOR OF ONE-HALF HIS RIGHT TO HENRY DOANE, OF SAME PLACE.

IMPROVEMENT IN TRUNDLE TOYS.

Specification forming part of Letters Patent No. 190,978, dated May 22, 1877; application filed April 16, 1877.

*To all whom it may concern:*

Be it known that I, HARRY P. PFLUM, of Cincinnati, Hamilton county, Ohio, have invented a new and useful Trundling-Toy, of which the following is a specification:

My trundling-toy consists, essentially, of a shaft or handle of any convenient length, and having journaled near one of its ends a driving-wheel, that is adapted to run upon the ground and impart a vibrating motion to an imitation horse or other appropriate animal by means of a connecting-rod. The animal is pivoted, near the center of its body, to the aforesaid shaft, and the connecting-rod is capable of being coupled either to the front or hind legs of the horse, according to the manner in which the toy is to be used. Furthermore, my toy is provided with a spring-ratchet or arrangement for producing a noise, said ratchet being equally effective in whatever direction the ground or driving wheel rotates, as hereinafter more fully described.

In the annexed drawings, Figures 1 and 2 are elevations representing the two different methods of applying the animal to the guiding shaft or handle. Fig. 3 is a representation of the ratchet attachment of the toy, a portion of said shaft being broken away.

A represents a bar or shaft of any suitable material, and of any convenient length. A handle, B, at the upper end of said shaft enables the toy to be controlled with facility. Pivoted near the front end of this shaft, at C, is the hub D of a driving-wheel, E, of any suitable size. Projecting from the rear side of this hub is a boss, F, which affords an extended bearing for pivot C, and also maintains wheel E a sufficient distance away from shaft A to prevent the pins G coming in contact with said shaft. These rearwardly-projecting pins, or other projections, are arranged in a circle concentric with pivot C, and they are adapted to operate against the free end of an elastic bar or rod or tongue, H, whose other end is inserted in shaft A at $h$, and is secured in position with a staple, I. Pivoted to this shaft at J is an imitation horse or other appropriate animal, K, made of wood or other light material, and painted or caparisoned in any desired manner.

This imitation animal has a perforation, L, in its front leg, and a similar perforation, L', in its hind leg, with either of which apertures may be engaged a ring-eye or screw, or other convenient device, M, wherewith said animal is coupled to the upper end of a connecting-rod, N, whose lower end is pivoted to driving-wheel E at O.

As generally employed, this screw is inserted in aperture L of the animal's front leg, as seen in Fig. 1, and when the toy is thus connected together it is propelled by resting wheel E upon the ground or floor, and then shoving the device forward or pulling it back with handle A B. As wheel E rotates, connecting-rod N imparts a rocking motion to the pivoted animal J K, and, at the same time, the ratchet arrangement G H produces a constant noise, which greatly enhances the value of the toy in the estimation of the juveniles.

Owing to the peculiar arrangement of pins G and elastic device H, the toy will operate no matter in what direction wheel E rotates; and, therefore, shaft A may be alternately thrust from and drawn toward the operator when desired. This advantage renders the toy a source of great amusement to small children who are confined in chairs or other secure places.

Another use may be made of the toy by simply engaging screw M with aperture L' of the horse's hind leg, as seen in Fig. 2, which act causes shaft A to incline in an opposite direction, or toward the animal's head. The juvenile can now straddle the horse, but without coming in actual contact with the animal or its saddle, and then grasp the upper end of shaft A B, so as to guide and control the toy in the same manner as boys do when they ride upon broomsticks.

In this condition of the device the horse has the same rocking motion imparted to him by wheel E and rod N, as previously described, and the ratchet attachment G H operates continuously as long as the toy is in motion.

I am aware that it is not new to pivot an imitation animal to a shaft or handle and impart a rocking motion to the animal by means of a driving-wheel and connecting-rod; and, consequently, my claim to such toys is limited to the combination herein described, whereby the coupling device M is rendered capable of engagement with suitable apertures in the front and rear legs of the animal, for the object stated.

I claim as my invention—

An improved trundling toy, consisting of shaft A, driving-wheel C D E, connecting-rod N O, and imitation animal K, the latter being pivoted to said shaft at J, and having two apertures, L L', for optional engagement of coupling device M, substantially as herein described, and for the purpose set forth.

In testimony of which invention I hereunto set my hand.

HARRY P. PFLUM.

Witnesses:
JAMES H. LAYMAN,
L. H. BOND.